US 8,089,656 B2

(12) United States Patent
Oota

(10) Patent No.: US 8,089,656 B2
(45) Date of Patent: Jan. 3, 2012

(54) IMAGE PROCESSING APPARATUS, IMAGE FORMING APPARATUS, AND IMAGE PROCESSING METHOD

(75) Inventor: Naoki Oota, Kanagawa (JP)

(73) Assignee: Ricoh Company Limited, Tokyo (JP)

( * ) Notice: Subject to any disclaimer, the term of this patent is extended or adjusted under 35 U.S.C. 154(b) by 740 days.

(21) Appl. No.: 12/232,139

(22) Filed: Sep. 11, 2008

(65) Prior Publication Data

US 2009/0067712 A1    Mar. 12, 2009

(30) Foreign Application Priority Data

Sep. 12, 2007   (JP) .................................. 2007-237155
Aug. 4, 2008    (JP) .................................. 2008-200936

(51) Int. Cl.
*H04N 1/04*    (2006.01)
(52) U.S. Cl. .......... 358/1.9; 358/539; 358/537; 358/452
(58) Field of Classification Search ................... 358/1.9, 358/539, 537, 452, 462
See application file for complete search history.

(56) References Cited

U.S. PATENT DOCUMENTS

2001/0024290 A1*   9/2001   Toriyama ..................... 358/1.9
2004/0095605 A1*   5/2004   Moro ............................ 358/2.1
2004/0179741 A1*   9/2004   Ozawa et al. ................ 382/232

FOREIGN PATENT DOCUMENTS

JP   2004-104442   4/2004
JP   2005-064639   3/2005
JP   2005-323406   11/2005

* cited by examiner

*Primary Examiner* — Houshang Safaipour
(74) *Attorney, Agent, or Firm* — Harness, Dickey & Pierce, P.L.C.

(57) ABSTRACT

An image processing apparatus includes an input control unit that receives an input of image data and a first image-processing unit that performs first image processing on image data received from an image reading unit thereby obtaining first-processed image data. A first output control unit selectively-outputs the first-processed image data to any of the input control unit and an external storage unit. A second image-processing unit receives the first-processed image data from the input control unit and performs second image processing on the first-processed image data thereby obtaining second-processed image data, and a second output control unit outputs the second-processed image data.

19 Claims, 16 Drawing Sheets

IMAGE PROCESSING APPARATUS, IMAGE FORMING APPARATUS, AND IMAGE PROCESSING METHOD

CROSS-REFERENCE TO RELATED APPLICATIONS

The present application claims priority to and incorporates by reference the entire contents of Japanese priority document 2007-237155 filed in Japan on Sep. 12, 2007 and Japanese priority document 2008-200936 filed in Japan on Aug. 4, 2008.

BACKGROUND OF THE INVENTION

1. Field of the Invention

The present invention relates to an image processing apparatus, an image forming apparatus, and an image processing method.

2. Description of the Related Art

An image forming apparatus including a plurality of functions of a facsimile machine, a printer, a scanner, a copier, and the like, such as a multifunction printer or a digital multifunction product (MFP), has been in widespread use. The image forming apparatus creates image data on a document or the like by reading the document or the like with the scanner function, performs predetermined image processing on the created image data, and then outputs the processed image data to the printer function. Such an image forming apparatus has been disclosed in, for example, Japanese Patent Application Laid-open No. 2004-104442.

FIG. 16 is a block diagram of the image forming apparatus disclosed in Japanese Patent Application Laid-open No. 2004-104442. The image forming apparatus includes a scanner unit 901, an image processing unit 902, and a printer unit 903.

The image processing unit 902 includes a shading processing unit 902a, an interline-correction processing unit 902b, a scanner gamma processing unit 902c, a text/photo determining unit 902d, a color-correction processing unit 902e, a reduction/enlargement processing unit 902f, a shift processing unit 902g, a printer gamma processing unit 902h, and a tone processing unit 902i. Incidentally, the shading processing unit 902a, the interline-correction processing unit 902b, the scanner gamma processing unit 902c, and the text/photo determining unit 902d perform image processing on an input image that is an image read by the scanner unit 901. The color-correction processing unit 902e, the reduction/enlargement processing unit 902f, the shift processing unit 902g, the printer gamma processing unit 902h, and the tone processing unit 902i perform image processing on an output image that is an image to be printed by the printer unit 903.

However, users' needs with respect to the image forming apparatus vary greatly. Some users may demand a function other than those included in the image processing unit 902. For example, a variable range of a reduction/enlargement ratio of the reduction/enlargement processing unit 902f may vary among users.

However, if the conventional image forming apparatus is configured to meet the various needs, following problems occur.

As image data flows on a single data path from the shading processing unit 902a to the tone processing unit 902i, to add a new function, it is necessary to provide a new image processing unit for realizing the new function in this data path.

Furthermore, as the enlargement ratio increases, for example, an amount of data to be processed by the reduction/enlargement processing unit 902f disadvantageously increases. As the amount of data to be processed increases, the processing speed of the reduction/enlargement processing unit 902f decreases. If the processing speed of the reduction/enlargement processing unit 902f drops below the input speed of the scanner unit 901, the single data path is unable to absorb the speed difference between the reduction/enlargement processing unit 902f and the scanner unit 901. Consequently, a user can only change the reduction/enlargement ratio within such a range that the processing speed of the reduction/enlargement processing unit 902f is higher than the input speed of the scanner unit 901.

Namely, to meet various needs of users with a single image processing unit, an image processing unit having as many functions as possible needs to be employed, and thus a cost increases disadvantageously. By the way, as a method for coping with the various needs of users, for example, techniques disclosed in Japanese Patent Application Laid-open No. 2005-323406 and Japanese Patent Application Laid-open No. 2005-64639 are conceivable.

However, in the technique disclosed in Japanese Patent Application Laid-open No. 2005-323406, a plurality of units is just controlled so as to control a scanner data path, a printer data path, and the like efficiently. Moreover, in the technique disclosed in Japanese Patent Application Laid-open No. 2005-64639, a plurality of data paths is arranged in parallel so as to reduce a circuit size. Therefore, these techniques cannot meet the purpose of providing a multifunctional capability to a single image processing unit.

SUMMARY OF THE INVENTION

It is an object of the present invention to at least partially solve the problems in the conventional technology.

According to an aspect of the present invention, there is provided an image processing apparatus. The image processing apparatus includes an input control unit that receives an input of image data; a first image-processing unit that performs first image processing on image data received from an image reading unit thereby obtaining first-processed image data, the first image processing including correction processing for correcting a defect in the image data caused by characteristics of the image reading unit; a first output control unit that selectively outputs the first-processed image data to any of the input control unit and an external storage unit; a second image-processing unit that receives the first-processed image data from the input control unit and performs second image processing on the first-processed image data thereby obtaining second-processed image data, the second image processing including a color space conversion; and a second output control unit that outputs the second-processed image data.

According to another aspect of the present invention, there is provided an image forming apparatus. The image forming apparatus includes an input control unit that receives an input of image data; a storage unit that stores therein the image data; a first image-processing unit that performs first image processing on image data received from an image reading unit thereby obtaining first-processed image data, the first image processing including correction processing for correcting a defect in the image data caused by characteristics of the image reading unit; a first output control unit that selectively outputs the first-processed image data to any of the input control unit and the storage unit; a control unit that decides whether the first output control unit is to output the first-processed image data to the input control unit or the storage unit; a second image-processing unit that receives the first-processed image data from the input control unit and performs second image processing on the first-processed image data thereby obtaining second-processed image data, the second image processing including a color space conversion; and a second output control unit that outputs the second-processed image data.

According to still another aspect of the present invention, there is provided an image processing method. The image processing method includes performing first image processing on image data received from an image reading unit thereby obtaining first-processed image data, the first image processing including correction processing for correcting a defect in the image data caused by characteristics of the image reading unit; selectively performing an output processing or a second image processing, the output processing including outputting the first-processed image data to an external storage unit, and the second image processing including processing the first-processed image data thereby obtaining second-processed image data, the second image processing including a color space conversion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. Incidentally, in the embodiments described below, the present invention is applied to a copier as an example of an image forming apparatus. However, the present invention can be applied to a digital multifunction product (MFP) including a plurality of functions of a copier, a facsimile machine, a printer, and the like all in one package thereof.

Figure 1:
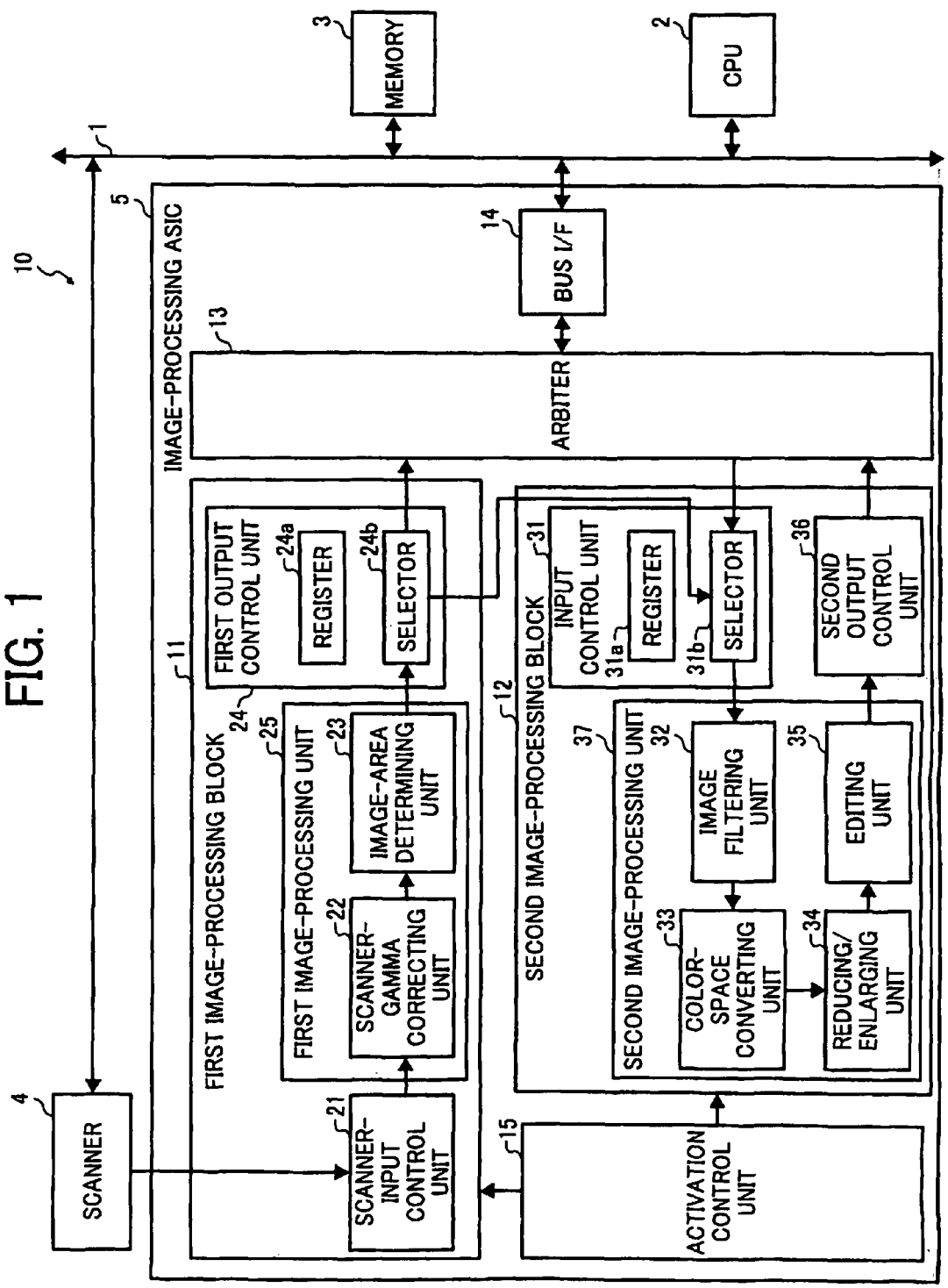
FIG. 1 is a block diagram of a copier according to a first embodiment of the present invention.

FIG. 1 is a block diagram of a copier 10 according to a first embodiment of the present invention. The copier 10 includes a bus 1, a central processing unit (CPU) 2, a memory 3, a scanner 4, and an image-processing application specific integrated circuit (ASIC) 5. The CPU 2, the memory 3, the scanner 4, and the image-processing ASIC 5 are connected to the bus 1.

Incidentally, a configuration of the image-processing ASIC 5 is mainly depicted in FIG. 1. Configurations of the other units, such as a printing unit that prints out image data, are omitted from FIG. 1 for the sake of simplicity.

The CPU 2 is a control unit, and controls the entire copier 10. The memory 3 is an external storage unit, and serves as a working area of the CPU 2, a storage area of image data, and the like. The scanner 4 is an image reading unit, and creates digital image data by converting a read image into an electrical signal with a charge-coupled device (CCD) (not shown).

The image-processing ASIC 5 is an image processing unit, and includes a first image-processing block 11, a second image-processing block 12, an arbiter 13, a bus interface (I/F) 14, and an activation control unit 15.

The first image-processing block 11 is a block in which image data received from the scanner 4 is processed. The first image-processing block 11 includes a scanner-input control unit 21, a first image-processing unit 25, and a first output control unit 24.

The scanner-input control unit 21 absorbs the speed difference between an image-data input speed of the scanner 4 and an image-processing speed of the first image-processing unit 25.

The first image-processing unit 25 performs various image processing on the image data. Such image processing includes, although not limited to, correction processing with respect to a defect caused by characteristics of the scanner 4. The first image-processing unit 25 includes a scanner-gamma correcting unit 22 and an image-area determining unit 23.

The scanner-gamma correcting unit 22 performs scanner-gamma correction processing on the image data. The scanner-gamma correction processing includes, although not limited to, correction of a gap between lines of the color CCD of the scanner 4 and shading correction of image data with a black or white reference image.

The image-area determining unit 23 extracts features of image data. Subsequently, based on the extracted features the image-area determining unit 23 divides the image data into portions containing a chromatic color image, an achromatic color image, a text image, or a photo image, for example.

Incidentally, the scanner-input control unit 21, the scanner-gamma correcting unit 22, and the image-area determining unit 23 respectively include a register (not shown) in which data set by the CPU 2 is stored. Whether each of the scanner-input control unit 21, the scanner-gamma correcting unit 22, and the image-area determining unit 23 performs processing and a processing content to be performed are controlled based on the data stored in the register.

The first output control unit 24 includes a register 24a, a selector 24b, and a direct memory access (DMA) controller (not shown). The register 24a stores therein data set by the CPU 2. The first output control unit 24 controls the selector 24b based on the data stored in the register 24a, and also controls a data path used for writing image data on the memory 3 or outputting image data to the second image-processing block 12.

The second image-processing block 12 is a block in which image data is processed to image data for an output image (a print image). The second image-processing block 12 includes an input control unit 31, a second image-processing unit 37, and a second output control unit 36.

The input control unit 31 includes a register 31a, a selector 31b, and a DMA controller (not shown). The register 31a stores therein data set by the CPU 2. The input control unit 31 controls the selector 31b based on the data stored in the register 31a, and also controls a data path used for receiving image data read out from the memory 3 or receiving image data from the first image-processing block 11.

The second image-processing unit 37 includes an image filtering unit 32, a color-space converting unit 33, a reducing/enlarging unit 34, and an editing unit 35.

The image filtering unit 32 performs an image filtering process, such as an edge enhancement of a text image in image data and smoothing of a photo image in image data.

The color-space converting unit 33 performs a color correction with a divided hue masking method and a color matching process with a three-dimensional look up table (3D-LUT). Specifically, the color-space converting unit 33 performs a color space conversion for converting image data into print image data or display image data.

In the color space conversion for converting image data into print image data, for example, red-green-blue (RGB) image data or standard RGB (sRGB) image data is converted into cyan-magenta-yellow-black (CMYK) image data. In the color space conversion for converting image data into display image data, for example, RGB image data is converted into sRGB image data.

The reducing/enlarging unit 34 reduces or enlarges image data.

The editing unit 35 edits image data. For example, the editing unit 35 performs data deletion/addition, mask processing, and the like on image data.

Incidentally, the image filtering unit 32, the color-space converting unit 33, the reducing/enlarging unit 34, and the editing unit 35 respectively include a register (not shown) in which data set by the CPU 2 is stored. Whether each of the image filtering unit 32, the color-space converting unit 33, the reducing/enlarging unit 34, and the editing unit 35 performs processing and a processing content to be performed are controlled based on the data stored in the register.

The second output control unit 36 includes a register (not shown) and a DMA controller (not shown). The register stores therein data set by the CPU 2. The second output control unit 36 controls image data processed by the second image-processing unit 37 to be output to the memory 3 or the like based on the data stored in the register.

The arbiter 13 arbitrates requests for access to the memory 3 from the first and second image-processing blocks 11 and 12.

The bus I/F 14 is an interface between the image-processing ASIC 5 and the bus 1. The bus I/F 14 is used for data transmission in the access control by the CPU 2 or the image data read/write with respect to the memory 3.

The activation control unit 15 includes a register (not shown) for storing therein activation data for activating each of the first and second image-processing blocks 11 and 12. The activation control unit 15 activates the first and second image-processing blocks 11 and 12 either simultaneously or at different timings in accordance with the activation data.

Subsequently, an operation of the copier 10 and a flow of image data are explained in detail below with reference to FIGS. 2 to 12.

First, an operation of the copier 10 and a flow of image data when the copier 10 performs a normal printing process are explained below with reference to FIGS. 2 and 3.

Figure 2:
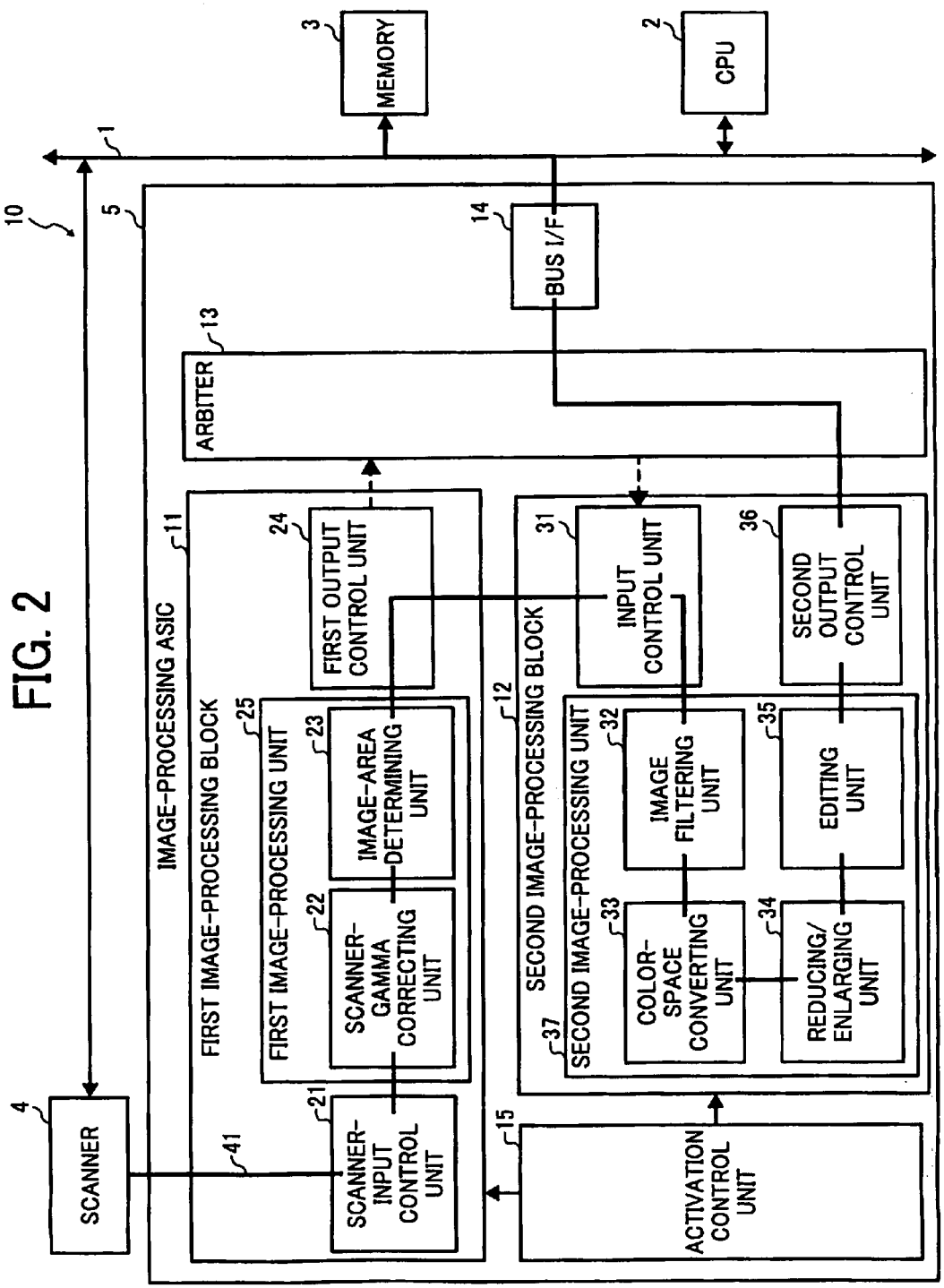
FIG. 2 is a block diagram of the copier according to the first embodiment for explaining a flow of image data when the copier performs a normal printing process.

FIG. 2 is a block diagram of the copier 10 for explaining a flow of image data when the copier 10 performs a normal printing process. In the normal printing process, data passes from the first output control unit 24 to the input control unit 31. The flow of image data is indicated by an arrow 41.

Figure 3:
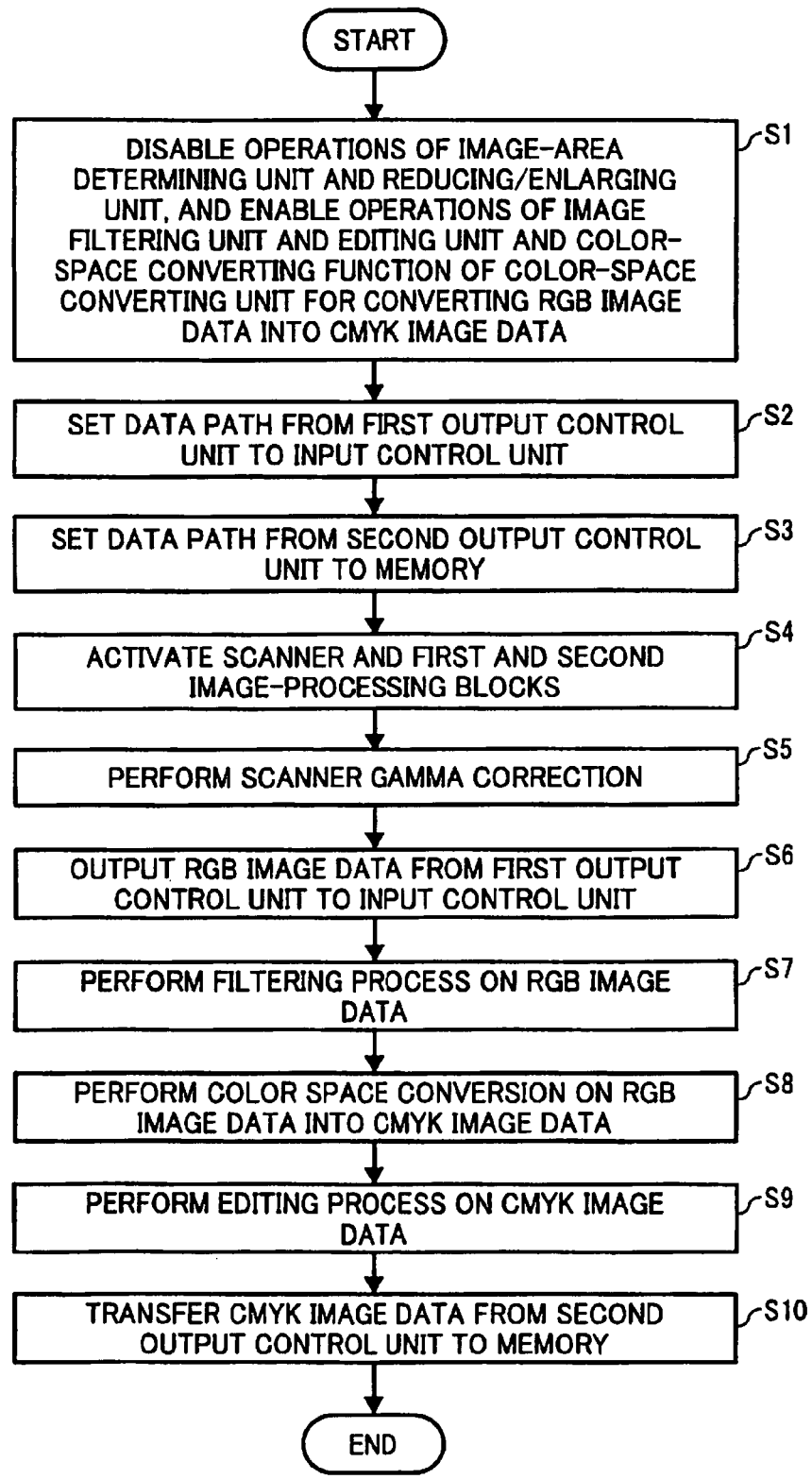
FIG. 3 is a flowchart of an operation of the copier shown in FIG. 2.

FIG. 3 is a flowchart of an operation of the copier 10 in the normal printing process, i.e., when the copier 10 prints out image data converted into print image data by the color-space converting unit 33.

The CPU 2 writes data for setting operations of the image-area determining unit 23 and the reducing/enlarging unit 34 to be disabled, data for setting operations of the image filtering unit 32 and the editing unit 35 to be enabled, and data for setting a color-space converting function of the color-space converting unit 33 for converting RGB image data into CMYK image data to be enabled on the corresponding registers (Step S1).

The CPU 2 writes data for setting the data path from the first output control unit 24 to the input control unit 31 on the register 24a and the register 31a (Step S2).

The CPU 2 writes data for setting a data path from the second output control unit 36 to the memory 3 on the register of the second output control unit 36 (Step S3).

The CPU 2 activates the scanner 4, and the activation control unit 15 activates the first and second image-processing blocks 11 and 12 (Step S4).

Upon receiving image data from the scanner 4 via the scanner-input control unit 21, the scanner-gamma correcting unit 22 performs a scanner gamma correction on the received image data (Step S5).

Upon receiving the image data, i.e., the RGB image data, from the scanner-gamma correcting unit 22 via the image-area determining unit 23, the first output control unit 24 outputs the RGB image data to the input control unit 31 in accordance with the data stored in the register 24a (Step S6).

The image filtering unit 32 performs a filtering process on the RGB image data output from the input control unit 31 (Step S7).

The color-space converting unit 33 performs a color space conversion for converting the filtered RGB image data into print image data, i.e., a color space conversion for converting the RGB image data into CMYK image data (Step S8).

Upon receiving the CMYK image data from the color-space converting unit 33 via the reducing/enlarging unit 34, the editing unit 35 performs an editing process on the CMYK image data (Step S9).

Upon receiving the CMYK image data from the editing unit 35, the second output control unit 36 DMA-transfers the CMYK image data to the memory 3 via the arbiter 13, the bus I/F 14, and the bus 1 in accordance with the data stored in the register (Step S10). Finally, the printing unit prints out the image data in the memory 3.

In this manner, when the copier 10 performs a normal printing process, the data path from the first output control unit 24 to the input control unit 31 is set.

When the copier 10 prints out reduced/enlarged image data, as a reduction/enlargement ratio increases, an amount of data throughput of the reducing/enlarging unit 34 increases. Therefore, it may happen that a processing speed of the reducing/enlarging unit 34 drops below the input speed of the scanner 4. When this happens, the speed difference between the processing speed of the reducing/enlarging unit 34 and the inputs speed of the scanner 4 cannot be absorbed within the data path shown in FIG. 2. Therefore, if there is only the data path shown in FIG. 2, a limitation exits that the image data can be reduced/enlarged at a reduction/enlargement ratio within such a range that the processing speed of the reducing/enlarging unit 34 is higher than the input speed of the scanner 4.

To solve this problem, in the present embodiment, a first data sub-path is provided from the first output control unit 24 to the memory 3 and a second data sub-path is provided from the memory 3 to the input control unit 31. When the processing speed of the reducing/enlarging unit 34 drops below the input speed of the scanner 4, image data that is read first is temporarily output via the first data sub-path to the memory 3 before the image data is reduced/enlarged by the reducing/enlarging unit 34. Upon completion of reading of the image data by the scanner 4, the image data that was previously stored in the memory 3 is output from the memory 3 to the input control unit 31 via the second data sub-path. After that, the image data is reduced/enlarged by the reducing/enlarging unit 34. In this manner, the speed difference between processing speed of the reducing/enlarging unit 34 and the input speed of the scanner 4 is absorbed in the first and second data sub-paths. As a result, the image data can be reduced/enlarged without bothering whether the processing speed of the reducing/enlarging unit 34 is lower than the input speed of the scanner 4.

An operation of the copier 10 and a flow of image data in a printing process when a processing speed for reducing/enlarging image data is lower than the input speed of the scanner 4 are explained below with reference to FIGS. 4 and 5. In this case, the first data sub-path from the first output control unit 24 to the memory 3 and the second data sub-path from the memory 3 to the input control unit 31 are set.

Figure 4:
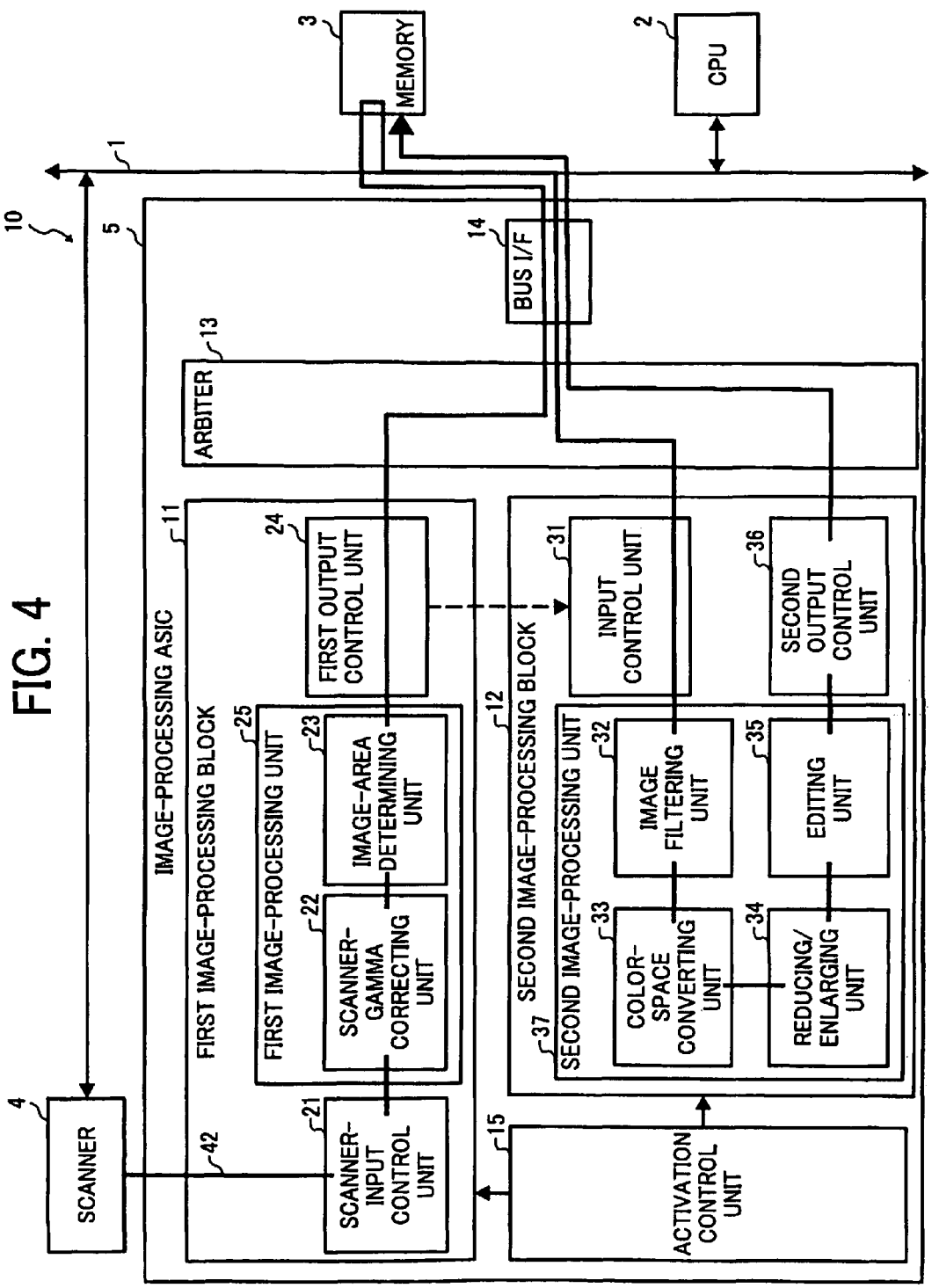
FIG. 4 is a block diagram of the copier according to the first embodiment for explaining a flow of image data when the copier performs a printing process with a data path from a first output control unit to a memory in a case where a processing speed for reducing/enlarging image data is lower than an input speed of a scanner.

FIG. 4 is a block diagram of the copier 10 for explaining a flow of image data when the copier 10 performs a printing process with the first data sub-path from the first output control unit 24 to the memory 3 and the second data sub-path from the memory 3 to the input control unit 31 in a case where a processing speed for reducing/enlarging image data is lower than the input speed of the scanner 4. The flow of image data is indicated by an arrow 42. FIG. 5 is a flowchart of an operation of the copier 10 shown in FIG. 4.

Incidentally, the CPU 2 can determine whether the processing speed for reducing/enlarging image data is lower than the input speed of the scanner 4 based on, for example, the setting of the reduction/enlargement ratio included in print setting information stored in the memory 3. For example, when a pixel clock of the scanner 4 is 30 megahertz (MHz) and a reduction/enlargement processing clock of the reducing/enlarging unit 34 is 120 MHz, if a reduction/enlargement ratio of 400% or more is set, the CPU 2 determines that the processing speed for reducing/enlarging image data is lower than the input speed of the scanner 4.

It is assumed that a portion of the memory 3 is reserved as a paged memory for storing therein image data received from the first output control unit 24 via the first data sub-path and another portion is reserved as a paged memory for storing therein image data received from the second output control unit 36 via a third data sub-path.

The CPU 2 writes data for setting an operation of the image-area determining unit 23 to be disabled, data for setting operations of the image filtering unit 32 and the editing unit 35 to be enabled, data for setting the color-space converting function of the color-space converting unit 33 for converting RGB image data into CMYK image data to be enabled, and data for setting a reduction/enlargement ratio used in a reducing/enlarging process performed by the reducing/enlarging unit 34 on each of the registers (Step S11).

The CPU 2 writes data for setting the first data sub-path on the register 24a and the second data sub-path on the register 31a. The first data sub-path extends from the first output control unit 24 to the memory 3 while the second data sub-path extends from the memory 3 to the input control unit 31 (Step S12).

Procedures from a setting of the data path from the second output control unit 36 to the memory 3 to scanner-gamma correction processing at Steps S13 to S15 are identical to those at Steps S3 to S5 in FIG. 3, and the description of those Steps is omitted.

Upon receiving the RGB image data from the scanner-gamma correcting unit 22 via the image-area determining unit 23, the first output control unit 24 DMA-transfers the RGB image data from the selector 24b to the memory 3 via the arbiter 13, the bus I/F 14, and the bus 1 in accordance with the data stored in the register 24a (Step S16). In other words, the RGB image data is DMA-transferred to the memory 3 via the first data sub-path.

The CPU 2 reads out the RGB image data from the memory 3, and outputs the image data to the input control unit 31 via the bus 1, the bus I/F 14, and the arbiter 13 (Step S17). In other words, the RGB image data in the memory is transferred to the input control unit 31 via the second data sub-path.

Procedures of an image filtering process and a color space conversion at Steps S18 and S19 are identical to those at Steps S7 and S8 in FIG. 3, and the description of those Steps is omitted.

The reducing/enlarging unit 34 reduces/enlarges the CMYK image data on which the color space conversion is performed at Step S19 at the reduction/enlargement ratio set in the register (Step S20).

Procedures of an editing process and image data transfer to the memory 3 at Steps S21 and S22 are identical to those at Steps S9 and S10 in FIG. 3, and the description of those Steps is omitted.

In this manner, the speed difference between processing speed of the reducing/enlarging unit 34 and the input speed of the scanner 4 can be absorbed. Therefore, the copier 10 can print out image data reduced/enlarged at such a reduction/enlargement ratio that a processing speed for reducing/enlarging the image data becomes lower than the input speed of the scanner 4.

Especially, because of the presence of the first data sub-path a time required for a printing process can be reduced because image data can be temporarily output to the memory 3 without involving the second image-processing block 12.

By the way, image data output to the memory 3 can be used for applications other than print image data. However, when the image data is output from the first output control unit 24 to the memory 3, the image data is RGB image data, so that the image data is not adapted for, for example, display image data.

Therefore, to increase the applicability of image data temporarily-output to the memory 3, the data path from the first output control unit 24 to the input control unit 31 is set so as to perform only a process of converting the image data into display image data in the second image-processing unit 37, and then the second output control unit 36 temporarily outputs the converted image data to the memory 3. After that, the data path from the memory 3 to the input control unit 31 is set so as to input the image data from the memory 3 to the input control unit 31, whereby the copier 10 can perform a printing process including a reducing/enlarging process on the image data. In this manner, while the applicability of image data temporarily-output to the memory 3 is increased, the image data can be reduced/enlarged even when the processing speed of the reducing/enlarging unit 34 is lower than the input speed of the scanner 4.

An operation of the copier 10 and a flow of image data in a printing process when a processing speed for reducing/enlarging image data is lower than the input speed of the scanner 4 are explained below with reference to FIGS. 6 and 7. In this case, the data path from the second output control unit 36 to the memory 3 and a third data sub-path from the memory 3 to the input control unit 31 are set.

Figure 6:
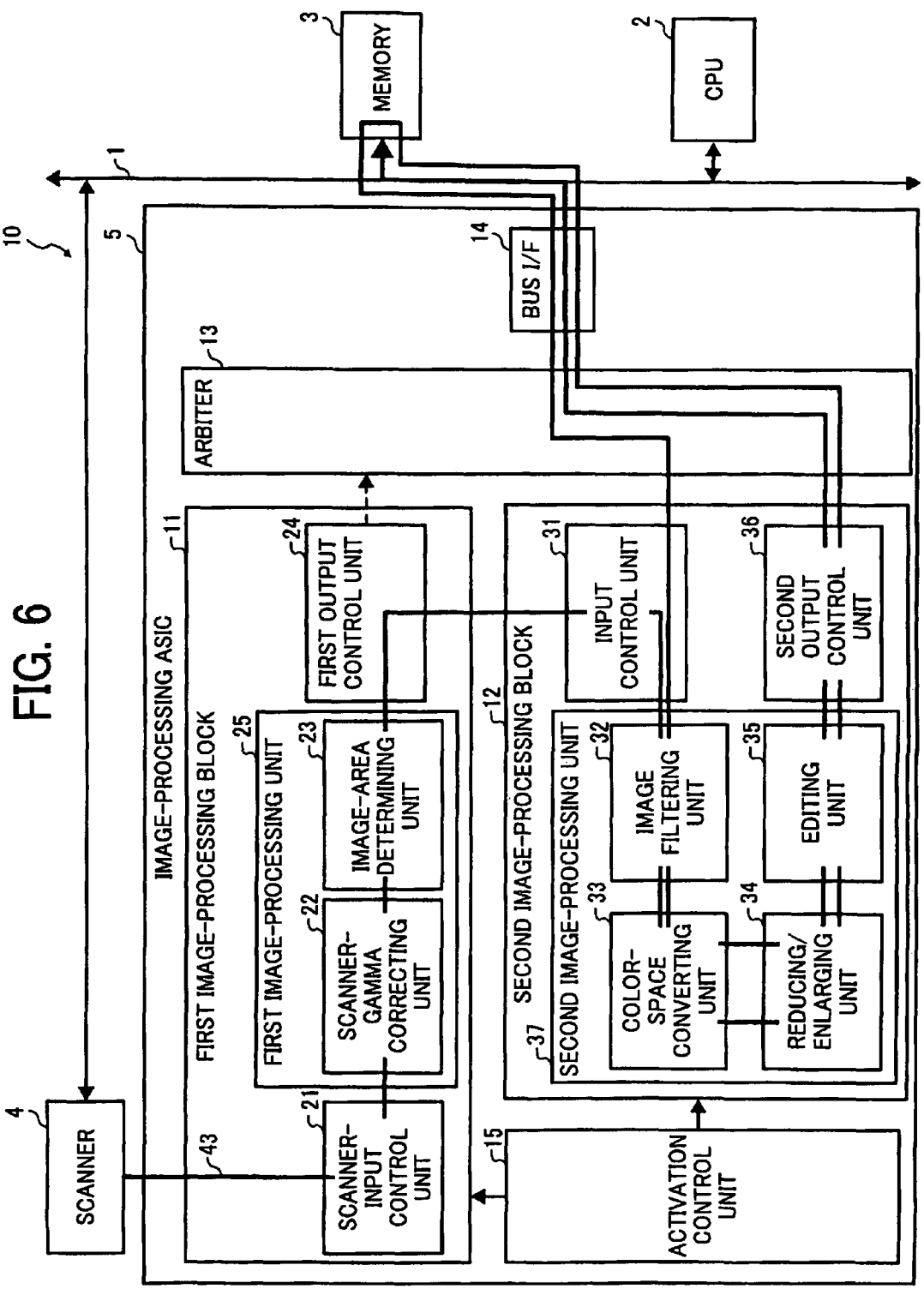
FIG. 6 is a block diagram of the copier according to the first embodiment for explaining a flow of image data when the copier performs a printing process with a data path from a second output control unit to the memory in a case where a processing speed for reducing/enlarging image data is lower than the input speed of the scanner.

FIG. 6 is a block diagram of the copier 10 for explaining a flow of image data when the copier 10 performs a printing process with the data path from the second output control unit 36 to the memory 3 and the data path from the memory 3 to the input control unit 31 in a case where a processing speed for reducing/enlarging image data is lower than the input speed of the scanner 4. The flow of image data is indicated by an arrow 43. FIG. 7 is a flowchart of an operation of the copier 10 shown in FIG. 6.

Incidentally, whether the processing speed for reducing/enlarging image data is lower than the input speed of the scanner 4 is determined in the same manner as described above with reference to FIGS. 4 and 5. Furthermore, it is assumed that a portion of the memory 3 is reserved as a paged memory for storing therein image data received from the second output control unit 36 and another portion is reserved as a paged memory for storing therein image data received from the input control unit 31.

The CPU 2 writes data for setting operations of the image-area determining unit 23, the image filtering unit 32, the reducing/enlarging unit 34, and the editing unit 35 to be disabled and data for setting the color-space converting function of the color-space converting unit 33 for converting RGB image data into sRGB image data to be enabled on the corresponding registers (Step S31).

Procedures from a setting of the data path from the first output control unit 24 to the input control unit 31 to an output of the image data to the input control unit 31 at Steps S32 to S36 are identical to those at Steps S2 to S6 in FIG. 3, and the description of those Steps is omitted.

Upon receiving the image data from the input control unit 31 via the image filtering unit 32, the color-space converting unit 33 performs a color space conversion for converting the image data into display image data, i.e., performs a color space conversion for converting the RGB image data into sRGB image data (Step S37).

Upon receiving the sRGB image data from the color-space converting unit 33 via the reducing/enlarging unit 34 and the editing unit 35, the second output control unit 36 DMA-transfers the sRGB image data to the memory 3 via the arbiter 13, the bus I/F 14, and the bus 1 in accordance with the data stored in the register (Step S38).

The CPU 2 writes data for setting operations of the image filtering unit 32 and the editing unit 35 to be enabled, data for setting the color-space converting function of the color-space converting unit 33 for converting sRGB image data into CMYK image data to be enabled, and data for setting a reduction/enlargement ratio used in a reducing/enlarging process performed by the reducing/enlarging unit 34 on each of the registers (Step S39).

The CPU 2 writes data for setting the third data sub-path from the memory 3 to the input control unit 31 on the register 31a (Step S40).

Figure 5:
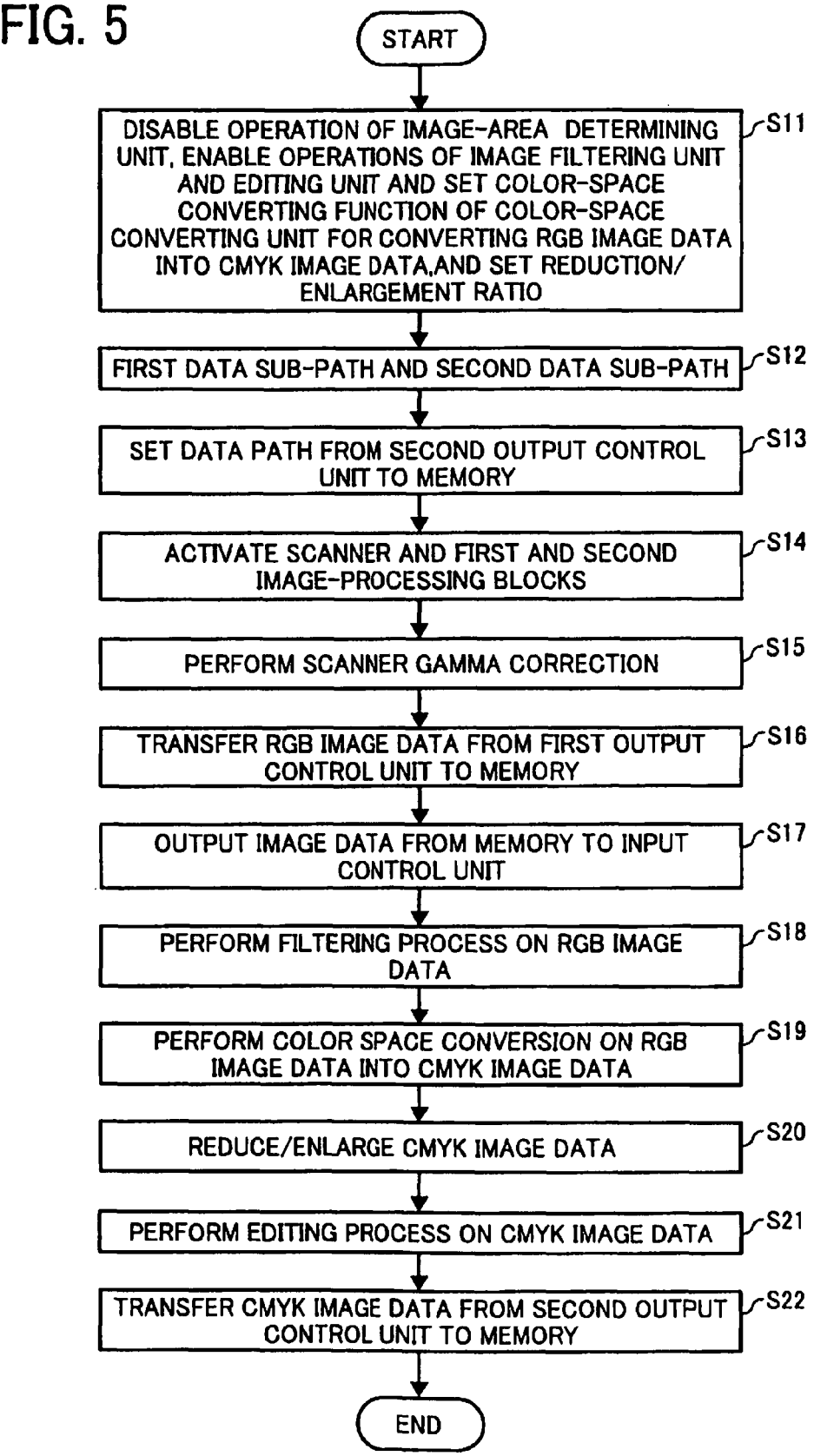
FIG. 5 is a flowchart of an operation of the copier shown in FIG. 4.

Procedures from an output of the image data to the input control unit 31 to a transfer of the image data to the memory 3 at Steps S41 to S46 are identical to those at Steps S17 to S22 in FIG. 5 with the exception of a conversion of the sRGB image data into CMYK image data at Step S43, and the description of those Steps is omitted.

In this manner, the speed difference between processing speed of the reducing/enlarging unit 34 and the input speed of the scanner 4 can be absorbed. Therefore, even when image data is enlarged at such an enlargement ratio that a processing speed of enlarging the image data is lower than the input speed of the scanner 4, the copier 10 can print out the enlarged image data.

Especially, the data path from the second output control unit 36 to the memory 3 is set, so that image data adapted for display image data, i.e., sRGB image data can be output to the memory 3. Therefore, the applicability of image data temporarily-output to the memory 3 can be increased. For example, when image data on which a printing process including a reducing/enlarging process is performed is sRGB image data, the image data can be displayed on a print-preview display screen or the like.

Incidentally, when a processing speed of reducing/enlarging image data is higher than the input speed of the scanner 4, such a printing process including the reducing/enlarging process is performed with the data path as explained above with reference to in FIG. 2.

In the present embodiment, as described above, the first data sub-path from the first output control unit 24 to the memory 3 and the third data sub-path from the memory 3 to the input control unit 31 are set so that the reducing/enlarging unit 34 can perform a reducing/enlarging process even when a processing speed of the reducing/enlarging unit 34 is lower than the input speed of the scanner 4.

However, the application of these data paths is not limited to the reduction/enlargement process. The data paths can be used in various applications. Other applications of the data paths are explained below.

An operation of the copier 10 and a flow of image data when image data processed with a scanner gamma correction is output to the memory 3 are explained below with reference to FIGS. 8 and 9.

Figure 8:
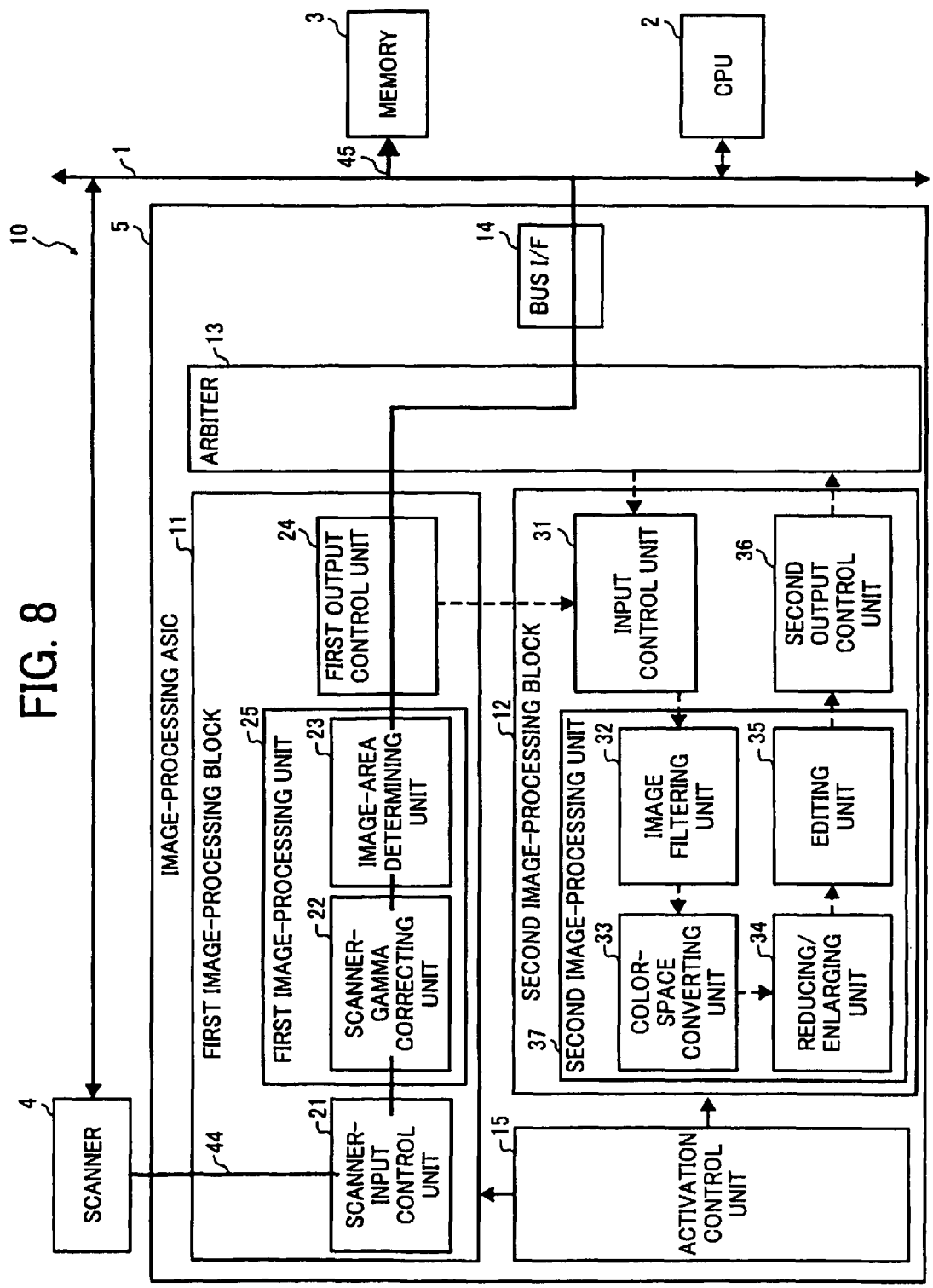
FIG. 8 is a block diagram of the copier according to the first embodiment for explaining a flow of image data when the copier outputs image data processed with a scanner gamma correction to the memory.

FIG. 8 is a block diagram of the copier 10 for explaining a flow of image data when the copier 10 outputs image data processed with a scanner gamma correction to the memory 3. In this case, the first data sub-path from the first output control unit 24 to the memory 3 is set. The flow of image data is indicated by an arrow 44.

Figure 9:
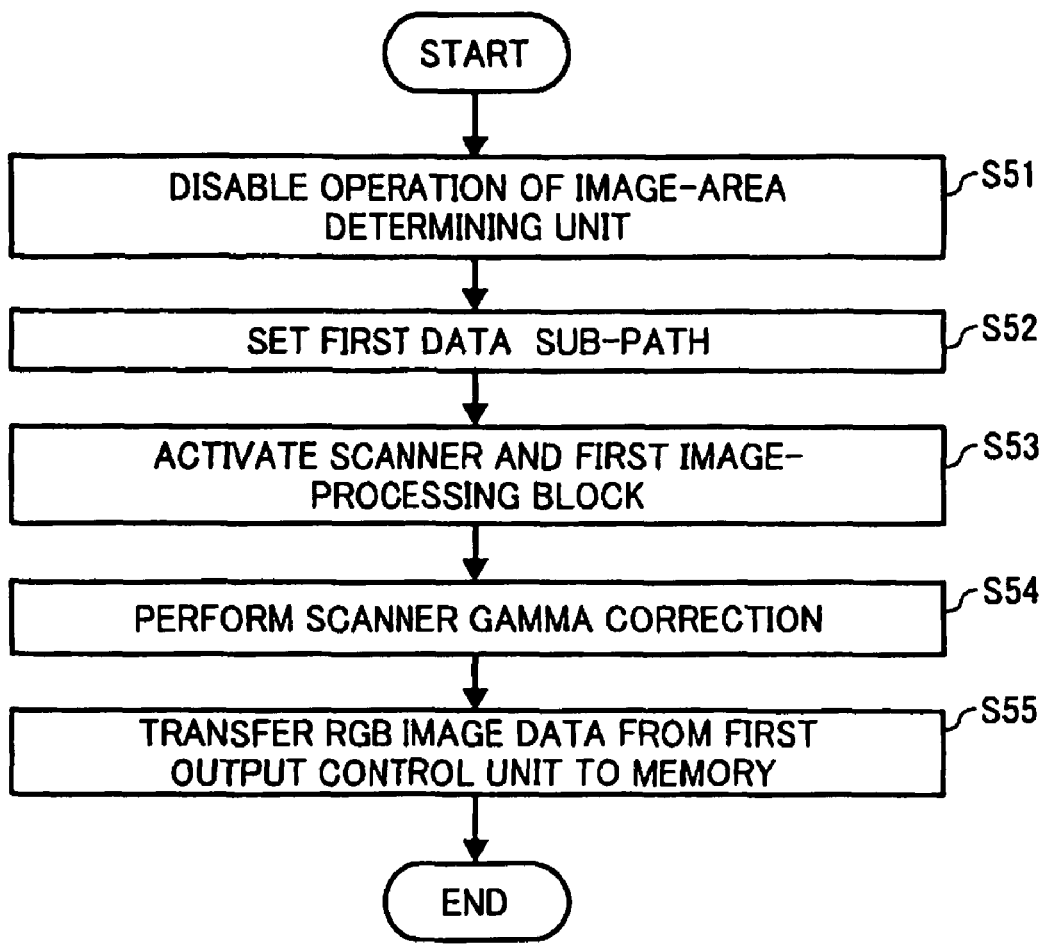
FIG. 9 is a flowchart of an operation of the copier shown in FIG. 8 when outputting the image data processed with the scanner gamma correction to the memory.

FIG. 9 is a flowchart of an operation of the copier 10 when outputting image data processed with a scanner gamma correction to the memory 3. In this case, the image-area determining unit 23 is not operated.

The CPU 2 writes data for setting an operation of the image-area determining unit 23 to be disabled on the register of the image-area determining unit 23 (Step S51).

The CPU 2 writes data for setting the first data sub-path from the first output control unit 24 to the memory 3 on the register 24a (Step S52).

The CPU 2 activates the scanner 4, and the activation control unit 15 activates the first image-processing block 11 (Step S53).

Procedures of a scanner gamma correction and a transfer of the image data to the memory 3 at Steps S54 and S55 are identical to those at Steps S15 and S16 in FIG. 5, and the description of those Steps is omitted.

In this manner, the first data sub-path from the first output control unit 24 to the memory 3 is set, so that image data processed with a scanner gamma correction, i.e., image data (RGB image data) before being converted into print image data (CMYK image data) can be output to the memory 3. Therefore, the image data processed with the scanner gamma correction can be used for applications other than print image data.

Furthermore, when the image data processed with the scanner gamma correction is compressed in, for example, a Joint Photographic Experts Group (JPEG) format, the volume of the image data can be reduced, and also the versatility of which can be increased. Thus, the image data processed with the scanner gamma correction can be stored in a portable memory media, such as a memory card, so as to be used in an external terminal.

Incidentally, such a JPEG compression can be performed by the CPU 2, or a JPEG compression chip can be separately provided to the copier 10. Furthermore, image data can be not only compressed but also elongated and contracted with JPEG.

Moreover, when the image-area determining unit 23 determines an image type of each of areas of image data, a result of the determination is output to the memory 3 together with the image data. In this case, the CPU 2 can perform various software processes on the image data written on the memory 3 based on the result of the determination written on the memory 3. For example, the CPU 2 can compress the image data in a high-compression Portable Document Format (PDF) based on the result of the determination. Therefore, even when the image data is compressed in a JPEG format, a high compression rate can be kept while sharpening a text area of the image data. Incidentally, to cause the image-area determining unit 23 to operate, the CPU 2 just writes data for setting an operation of the image-area determining unit 23 to be enabled on the register of the image-area determining unit 23.

Subsequently, an operation of the copier 10 and a flow of image data when image data converted into display image data is output to the memory 3 are explained below with reference to FIGS. 2 and 10.

Figure 10:
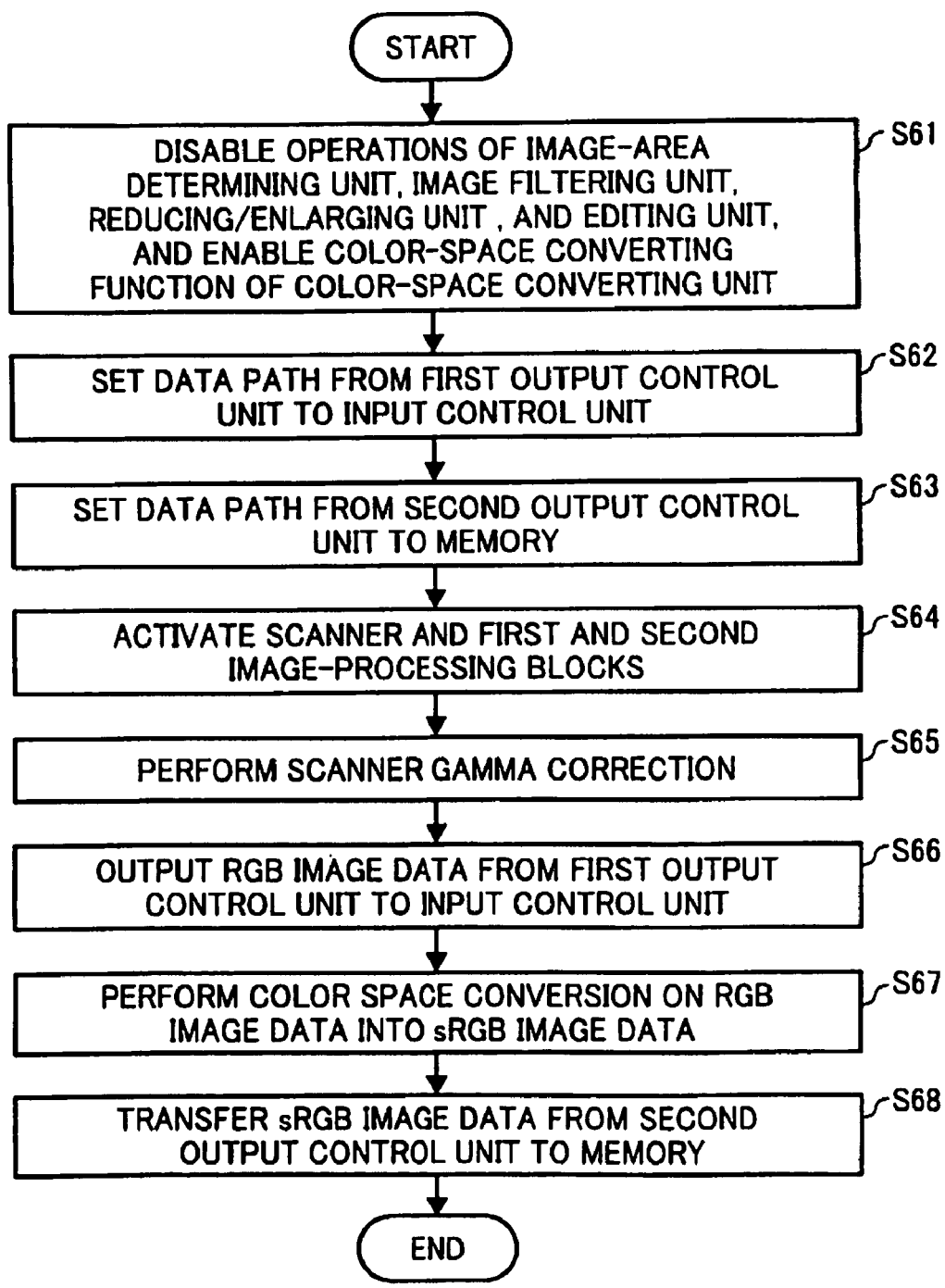
FIG. 10 is a flowchart of an operation of the copier according to the first embodiment when outputting image data converted into display image data to the memory.

FIG. 10 is a flowchart of an operation of the copier 10 when outputting image data converted into display image data to the memory 3. A flow of image data when the copier 10 outputs the image data converted into display image data to the memory 3 is identical to that is indicated by the arrow 41 shown in FIG. 2.

The CPU 2 writes data for setting operations of the image-area determining unit 23, the image filtering unit 32, the reducing/enlarging unit 34, and the editing unit 35 to be disabled and data for setting the color-space converting function of the color-space converting unit 33 for converting RGB image data into sRGB image data to be enabled on each of the registers (Step S61).

Figure 7:
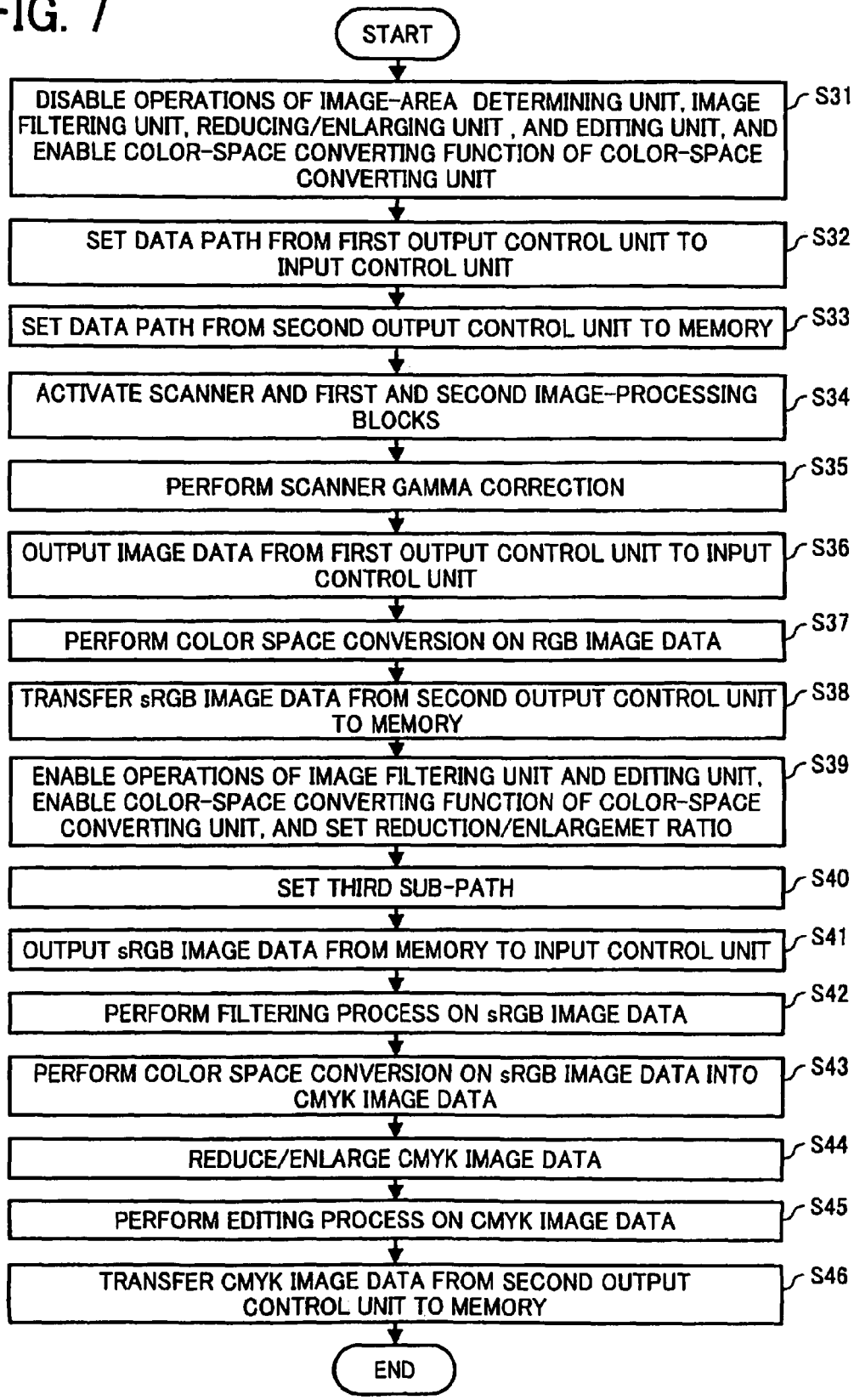
FIG. 7 is a flowchart of an operation of the copier shown in FIG. 6.

Procedures from a setting of the data path to a transfer of the image data at Steps S62 to S68 are identical to those at Steps S32 to S38 in FIG. 7, and the description of those Steps is omitted.

In this manner, the data path from the first output control unit 24 to the input control unit 31 is set, and a color space conversion for converting image data into display image data is performed, so that the image data adapted for display image data (the sRGB image data) can be output to the memory 3. Therefore, the copier 10 can display an image based on the image data output to the memory 3 on a display screen or the like. Furthermore, the image data can be stored in a memory media, such as a memory card, so as to be displayed on a display screen of an external terminal.

Moreover, when the display image data is compressed in a JPEG format or compressed in a high-compression PDF based on a result of determination by the image-area determining unit 23, or when the operation of the image-area determining unit 23 is enabled, the effects as described above can be obtained.

Subsequently, an operation of the copier 10 and a flow of the image data in a printing process of image data stored in the memory 3 are explained below with reference to FIGS. 11 and 12.

Figure 11:
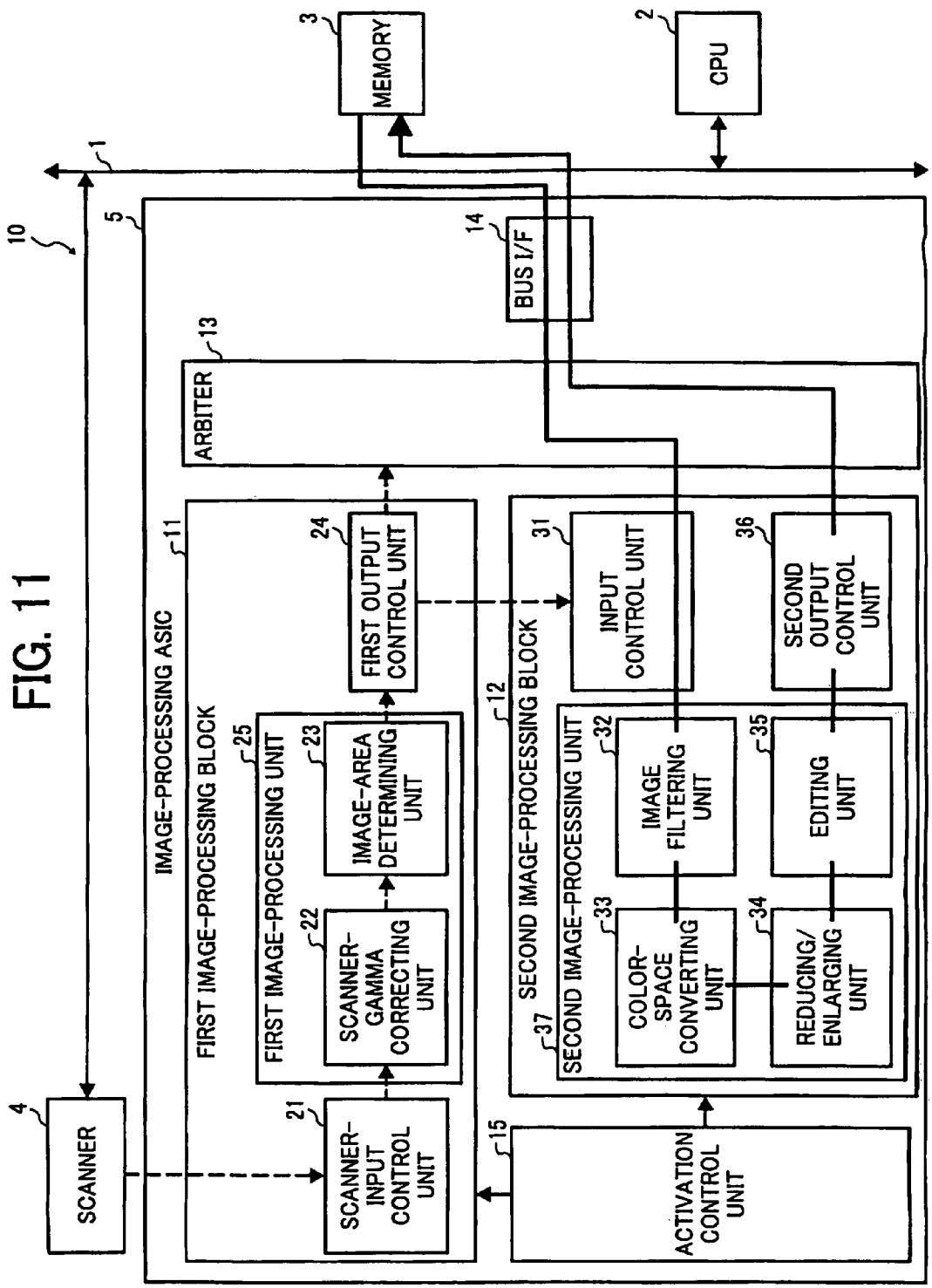
FIG. 11 is a block diagram of the copier according to the first embodiment for explaining a flow of image data when the copier prints out image data stored in the memory.

FIG. 11 is a block diagram of the copier 10 for explaining a flow of image data when the copier 10 prints out image data stored in the memory 3. In this case, the third data sub-path from the memory 3 to the input control unit 31 is set. The flow of the image data is indicated by an arrow 45.

Figure 12:
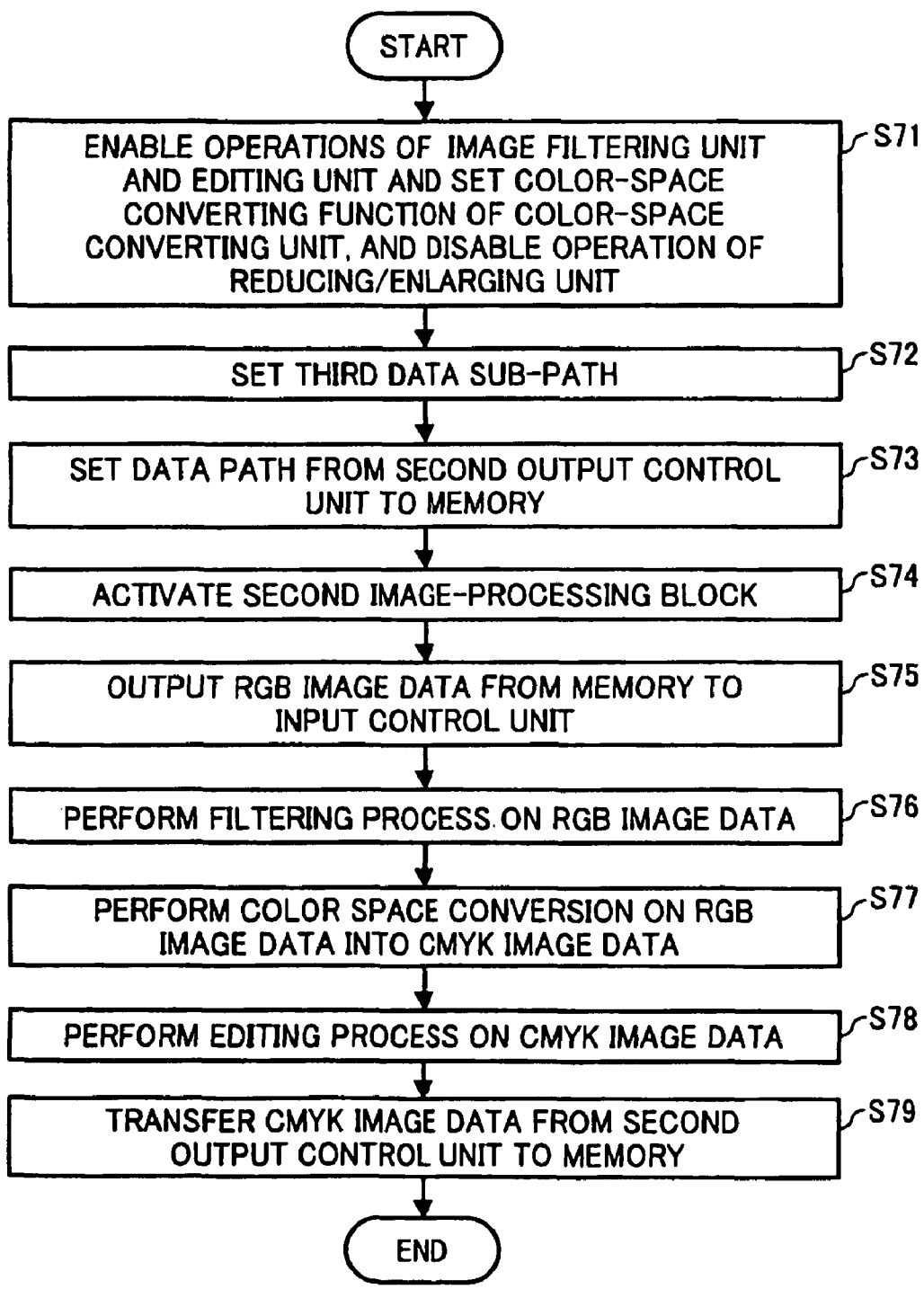
FIG. 12 is a flowchart of an operation of the copier shown in FIG. 11 when printing out the image data stored in the memory.

FIG. 12 is a flowchart of an operation of the copier 10 when printing out image data stored in the memory 3. In this case, the image data is converted into print image data by the color-space converting unit 33.

The CPU 2 writes data for setting operations of the image filtering unit 32 and the editing unit 35 to be enabled, data for setting the color-space converting function of the color-space converting unit 33 for converting RGB image data into CMYK image data to be enabled, and data for setting an operation of the reducing/enlarging unit 34 to be disabled on the corresponding registers (Step S71).

The CPU 2 writes data for setting the third data sub-path from the memory 3 to the input control unit 31 on the register 31a (Step S72).

The CPU 2 writes data for setting the data path from the second output control unit 36 to the memory 3 on the register of the second output control unit 36 (Step S73).

The activation control unit 15 activates the second image-processing block 12 (Step S74).

The CPU 2 reads out the RGB image data from the memory 3, and outputs the RGB image data to the input control unit 31 via the bus 1, the bus I/F 14, and the arbiter 13 (Step S75). In other words, the RGB image data is output from the memory 3 to the input control unit 31 via the third data sub-path.

Procedures from an image filtering process to a transfer of the image data at Steps S76 to S79 are identical to those at Steps S7 to S10 in FIG. 3, and the description of those Steps is omitted.

In FIG. 12, a case where RGB image data is converted into CMYK image data is explained as an example. As another example, sRGB image data can be converted into CMYK image data. In this case, the CPU 2 just writes data for setting the color-space converting function of the color-space converting unit 33 for converting sRGB image data into CMYK image data to be enabled.

In this manner, the third data sub-path from the memory 3 to the input control unit 31 is set, so that image data written on the memory 3 (see FIGS. 9 and 10) can be read out from the memory 3. The read image data is converted into print image data (CMYK image data), and the print image data is output to the memory 3. Therefore, the copier 10 can print out the image data written on the memory 3 in FIGS. 9 and 10.

Incidentally, when the image data written on the memory 3 in FIGS. 9 and 10 is compressed in a JPEG format and taken out from the memory 3, i.e., outside the copier 10, the image data can be loaded on the copier 10 again. The CPU 2 or the JPEG compression chip decompresses the image data, so that the image data can be used for the process shown in FIG. 12.

Furthermore, the copier 10 can download other image data, i.e., image data other than the image data written on the memory 3 in FIGS. 9 and 10 from a network via a network interface (not shown), or can load other image data from a memory card or the like. The downloaded/loaded image data can be used for the process shown in FIG. 12.

Moreover, in the present embodiment, the activation control unit 15 is configured to be able to activate the first image-processing block 11 and the second image-processing block 12 individually. Therefore, for example, the processes shown in FIGS. 9 and 12 can be performed in parallel. In this case, the activation control unit 15 activates each of the first and second image-processing blocks 11 and 12 separately based on the data stored in the register of the activation control unit 15, whereby different sets of image data can be processed in parallel.

As described above, in the copier 10 according to the first embodiment, the image-processing ASIC 5 as a single image processing unit selectively sets a data path depending on a process to be performed. Therefore, the copier 10 can perform various image processing.

Incidentally, in the above embodiment, each of the registers is built into each of the units, such as the first output control unit 24. Alternatively, all the registers can be arranged together in one place in the image-processing ASIC 5 in a centralized manner.

In the above first embodiment, the single image-processing ASIC 5 performs image processing on image data read by the scanner 4. In contrast, in a second embodiment of the present invention explained below, a functionally-extended image-processing ASIC is provided in addition to the image-processing ASIC 5 so that the two image-processing ASICs perform image processing on image data. Incidentally, the functionally-extended image-processing ASIC performs image processing on image data with a function for processing the image data to high-value added image data or the like. Such a function is not provided in the general image-processing ASIC.

Figure 13:
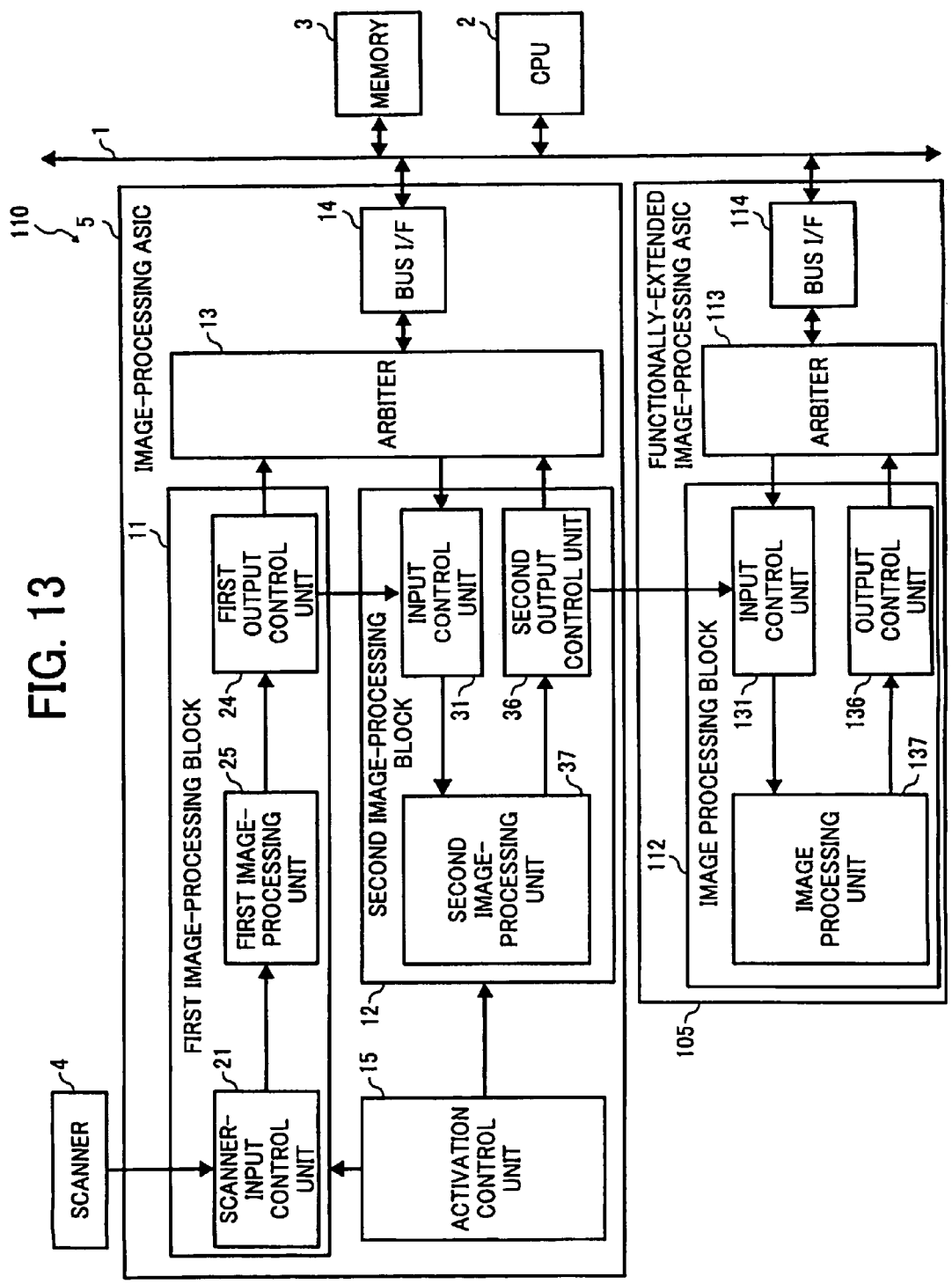
FIG. 13 is a block diagram of a copier according to a second embodiment of the present invention.

FIG. 13 is a block diagram of a copier 110 according to the second embodiment. The difference between the copier 10 and the copier 110 is that the copier 110 further includes a functionally-extended image-processing ASIC 105. The portions identical to those for the first embodiment are denoted with the same reference numerals, and the description of those portions is omitted.

The functionally-extended image-processing ASIC 105 is connected to the bus 1. The functionally-extended image-processing ASIC 105 includes an image processing block 112, an arbiter 113, and a bus I/F 114.

The image processing block 112 is a block in which image data is processed to image data for an output image (a print image). The image processing block 112 includes an input control unit 131, an image processing unit 137, and an output control unit 136.

The input control unit 131 includes a register (not shown) and a DMA controller (not shown). The register stores therein data set by the CPU 2. The input control unit 131 controls an input of image data transferred from the image-processing ASIC 5 or an input of image data read out from the memory 3 based on the data stored in the register.

The image processing unit 137 performs image processing on image data so as to add a higher value than that of image data processed by the second image-processing unit 37 in the image-processing ASIC 5 to the image data. The image processing unit 137 includes a register (not shown). The register stores therein data-set by the CPU 2. Whether the image processing unit 137 performs image processing and a processing content to be performed are controlled based on the data stored in the register.

The output control unit 136 includes a register (not shown) and a DMA controller (not shown). The register stores therein data set by the CPU 2. The output control unit 136 controls an output of the image data processed by the image processing unit 137 to the memory 3 based on the data stored in the register.

The arbiter 113 arbitrates requests for access to the memory 3 from the image processing block 112.

The bus I/F 114 is an interface between the functionally-extended image-processing ASIC 105 and the bus 1. The bus I/F 114 is used for data transmission in the access control by the CPU 2 or the image data read/write with respect to the memory 3.

Subsequently, an operation of the copier 110 and a flow of image data when a processing speed of a reducing/enlarging process performed by the image processing unit 137 is lower than an input speed of the scanner 4 are explained below with reference to FIGS. 14 and 15.

Figure 14:
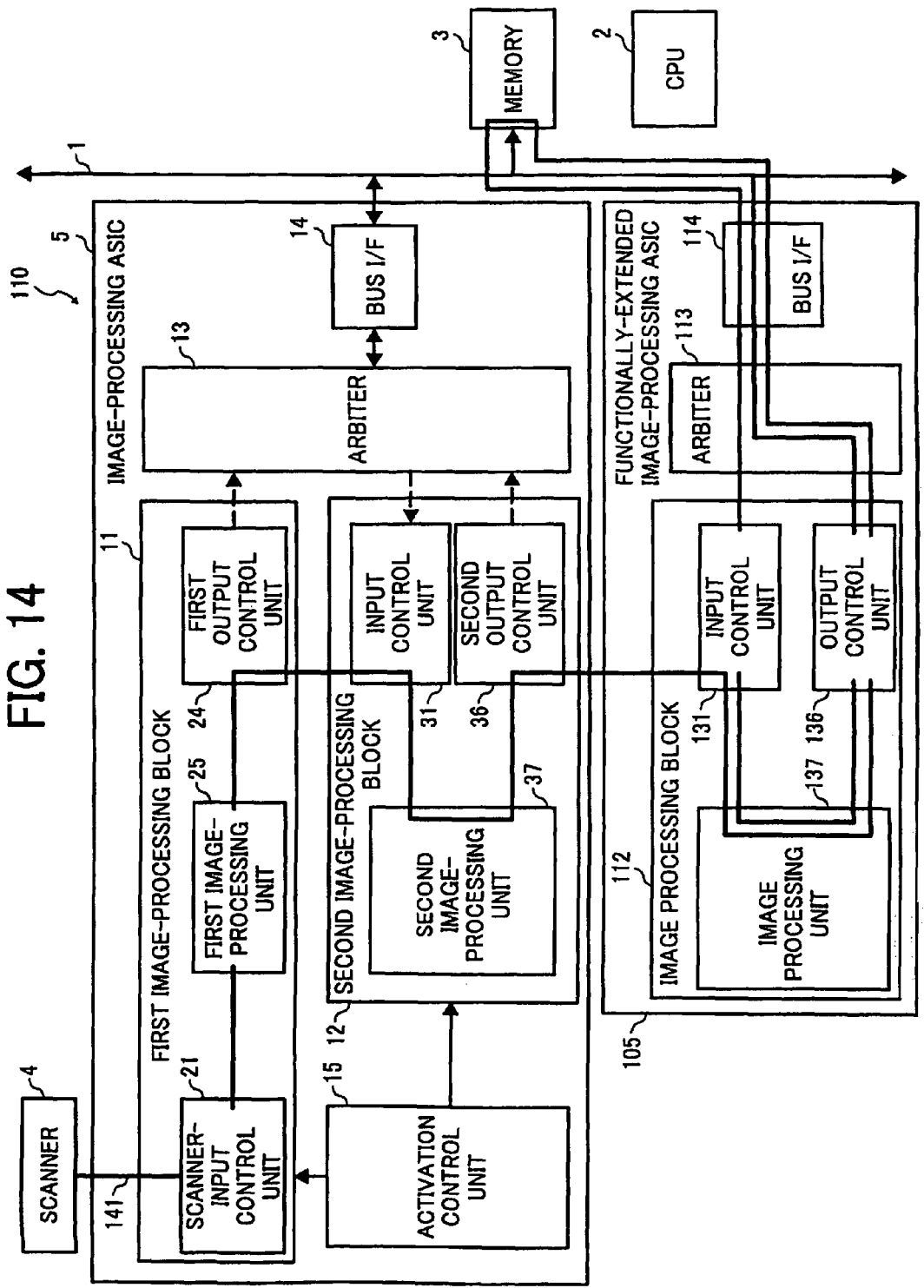
FIG. 14 is a block diagram of the copier according to the second embodiment for explaining a flow of image data when the copier prints out such reduced/enlarged image data that a processing speed for reducing/enlarging the image data is lower than the input speed of the scanner.
Figure 15:
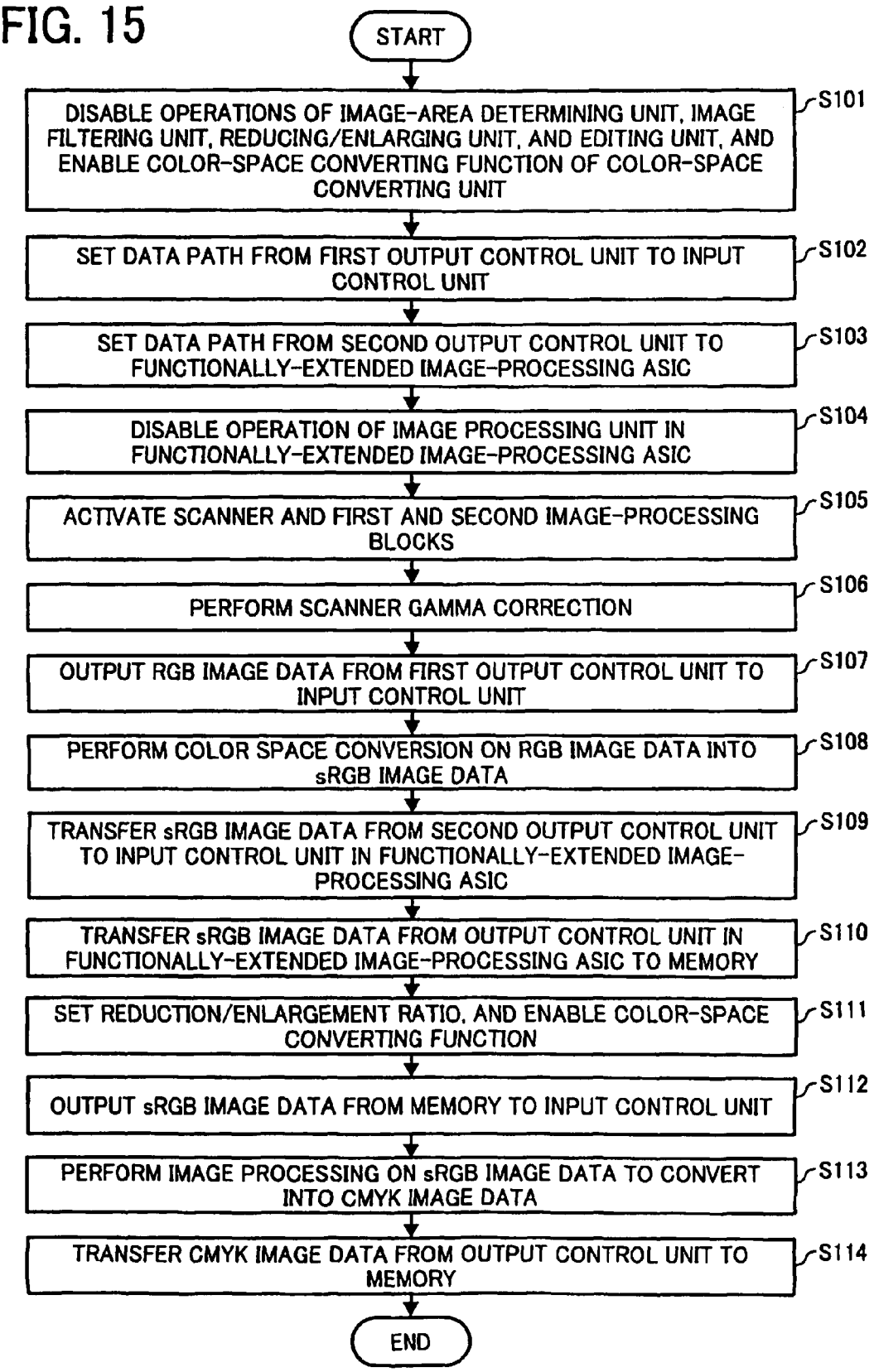
FIG. 15 is a flowchart of an operation of the copier shown in FIG. 14.
Figure 16:
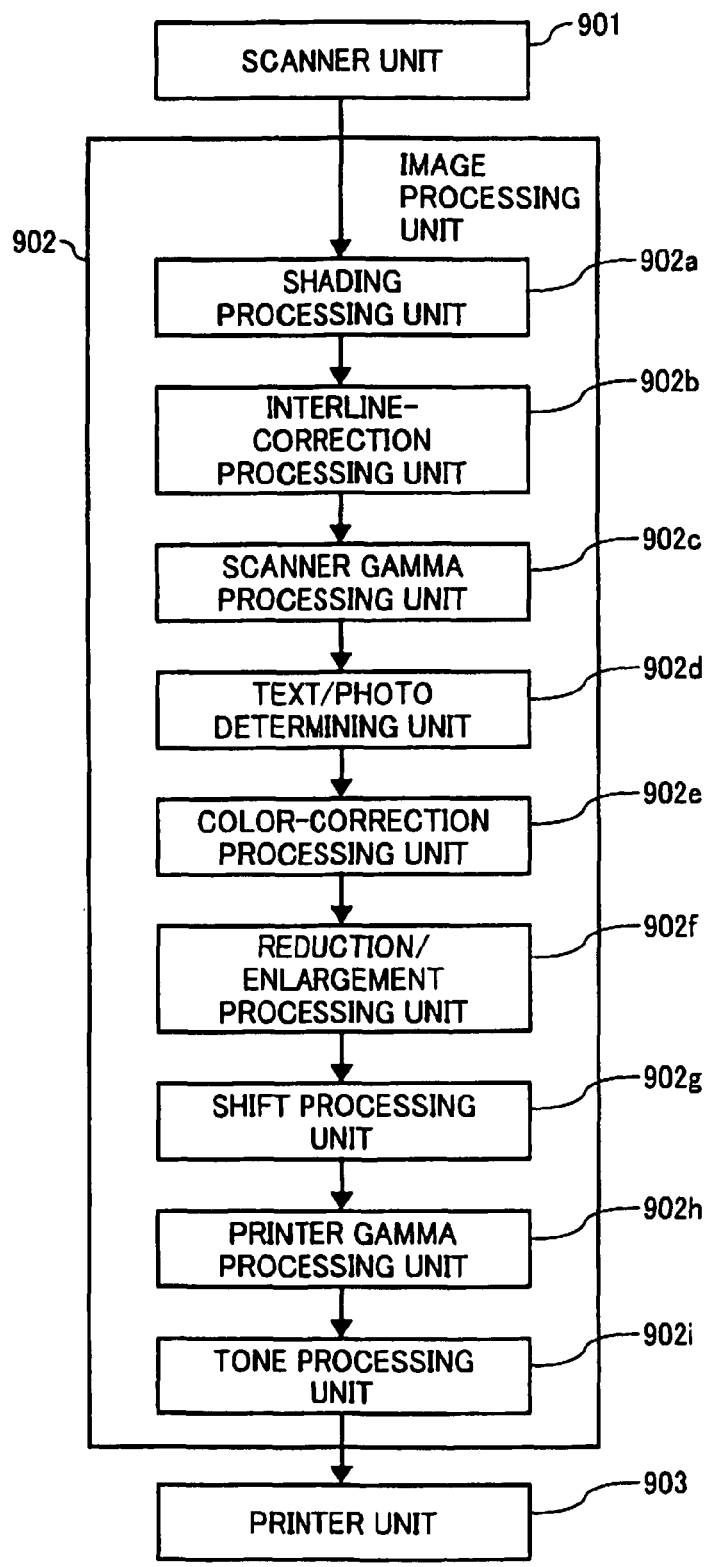
FIG. 16 is a block diagram of a conventional image forming apparatus.

FIG. 14 is a block diagram of the copier 110 for explaining a flow of image data when the copier 110 prints out such reduced/enlarged image data that a processing speed for reducing/enlarging the image data is lower than an input speed of the scanner 4. In this case, the data path from the first output control unit 24 to the input control unit 31 and a data path from the second output control unit 36 to the functionally-extended image-processing ASIC 105 are set. The flow of image data is indicated by an arrow 141. FIG. 15 is a flowchart of an operation of the copier 110 shown in FIG. 14.

Incidentally, whether the processing speed for reducing/enlarging image data is lower than the input speed of the scanner 4 is determined in the same manner as described in the first embodiment. Furthermore, it is assumed that a portion of the memory 3 is reserved as a paged memory for storing therein image data processed by the image-processing ASIC 5 and another portion is reserved as a paged memory for storing therein image data processed by the functionally-extended image-processing ASIC 105.

Procedures of settings of the units and a setting of the data path to the input control unit 31 at Steps S101 and S102 are identical to those at Steps S31 and S32 in FIG. 7, and the description of those Steps is omitted.

The CPU 2 writes data for setting the data path from the second output control unit 36 to the functionally-extended image-processing ASIC 105 on the register of the second output control unit 36 (Step S103).

The CPU 2 writes data for setting an operation of the image processing unit 137 in the functionally-extended image-processing ASIC 105 to be disabled on the register (Step S104).

Procedures from activation of the scanner 4 and the like to a color space conversion of image data into sRGB image data at Steps S105 to S108 are identical to those at Steps S34 to S37 in FIG. 7, and the description of those Steps is omitted.

Upon receiving the sRGB image data from the color-space converting unit 33 via the reducing/enlarging unit 34 and the editing unit 35, the second output control unit 36 transfers the sRGB image data to the input control unit 131 in the functionally-extended image-processing ASIC 105 in accordance with the data stored in the register (Step S109).

Upon receiving the sRGB image data from the input control unit 131 via the image processing unit 137, the output control unit 136 in the functionally-extended image-processing ASIC 105 DMA-transfers the sRGB image data to the memory 3 via the arbiter 113, the bus I/F 114, and the bus 1 in accordance with the data stored in the register (Step S110).

The CPU 2 writes data for setting a reduction/enlargement ratio used in a reducing/enlarging process performed by the image processing unit 137, data for setting the color-space converting function of the image processing unit 137 for converting sRGB image data into CMYK image data to be enabled, and the like on each of the registers (Step S111).

The CPU 2 reads out the sRGB image data from the memory 3, and outputs the sRGB image data to the input control unit 131 via the bus 1, the bus I/F 114, and the arbiter 113 (Step S112).

The image processing unit 137 performs image processing on the sRGB image data received from the input control unit 131 so as to add a higher value than that of image data processed by the second image-processing unit 37 in the image-processing ASIC 5 to the image data. For example, the image processing unit 137 performs a color space conversion to convert the sRGB image data into CMYK image data, or reduces/enlarges the image data at the reduction/enlargement ratio set in the register (Step S113).

The output control unit 136 DMA-transfers the CMYK image data processed by the image processing unit 137 to the memory 3 via the arbiter 113, the bus I/F 114, and the bus 1 in accordance with the data stored in the register (Step S114).

In this manner, the image-processing ASIC according to the second embodiment can selectively set a data path depending on a process to be performed. Therefore, the image-processing ASIC can be applied to various image forming apparatuses, such as the one including a functionally-extended image-processing ASIC.

According to an aspect of the present invention, various image processing functions can be realized at low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an input control unit that receives an input of image data;
a first image-processing unit that performs first image processing on image data received from an image reading unit thereby obtaining first-processed image data, the first image processing including correction processing for correcting a defect in the image data caused by characteristics of the image reading unit;
a first output control unit that selectively outputs the first-processed image data to any of the input control unit and an external storage unit;
a second image-processing unit that receives the first-processed image data from the input control unit and performs second image processing on the first-processed image data thereby obtaining second-processed image data, the second image processing including a color space conversion; and
a second output control unit that outputs the second-processed image data.

2. The image processing apparatus according to claim 1, wherein
the second image processing further includes a reducing/enlarging process,
the first output control unit outputs the first-processed image data to the input control unit when a processing speed of the reducing/enlarging process is higher than an input speed of the image reading unit, and outputs the first-processed image data to the external storage unit when the processing speed of the reducing/enlarging process is lower than the input speed of the image reading unit,
the input control unit receives an input of the first-processed image data from any of the first output control unit and the external storage unit, and
the second image-processing unit receives the first-processed image data from the input control unit and performs a first color space conversion for converting the first-processed image data into print image data and the reducing/enlarging process on the print image data thereby obtaining the second-processed image data.

3. The image processing apparatus according to claim 1, wherein the second output control unit outputs the second-processed image data to the external storage unit.

4. The image processing apparatus according to claim 3, wherein the input control unit receives an input of the first-processed image data from any of the first output control unit and the external storage unit.

5. The image processing apparatus according to claim 3, wherein
the second image processing further includes a reducing/enlarging process,
the first output control unit outputs the first-processed image data to the input control unit, and
the second image-processing unit receives the first-processed image data from the input control unit and performs,
when a processing speed of the reducing/enlarging process is higher than an input speed of the image reading unit, a first color space conversion for converting the first-processed image data into print image data and the reducing/enlarging process on the print image data thereby obtaining the second-processed image data, and
when the processing speed of the reducing/enlarging process is lower than the input speed of the image reading unit, a second color space conversion for converting the first-processed image data into display image data, and a third color space conversion for converting the display image data into print image data and the reducing/enlarging process on the print image data received from the external storage unit thereby obtaining the second-processed image data.

6. The image processing apparatus according to claim 2, wherein
the first-processed image data is red-green-blue image data,
the second-processed image data is cyan-magenta-yellow-black image data, and
the first color space conversion includes converting the red-green-blue image data into the cyan-magenta-yellow-black image data.

7. The image processing apparatus according to claim 5, wherein the first-processed image data is red-green-blue image data, the first color space conversion includes converting the red-green-blue image data into cyan-magenta-yellow-black image data as the print image data, the second color space conversion includes converting the red-green-blue image data into standard red-green-blue image data as the display image data, and the third color space conversion includes converting the standard red-green-blue image data into cyan-magenta-yellow-black image data as the second-processed image data.

8. The image processing apparatus according to claim 1, wherein the first image processing includes an image-area determining process.

9. The image processing apparatus according to claim 1, wherein the first output control unit decides whether to output the first-processed image data to the input control unit or to the external storage unit based on an instruction from outside.

10. The image processing apparatus according to claim 1, further comprising an activation control unit capable of activating a first image-processing block and a second image-processing block individually, the first image-processing block including the first image-processing unit and the first output control unit, and the second image-processing block including the input control unit, the second image-processing unit, and the second output control unit.

11. An image forming apparatus comprising:
an input control unit that receives an input of image data;
a storage unit that stores therein the image data;
a first image-processing unit that performs first image processing on image data received from an image reading unit thereby obtaining first-processed image data, the first image processing including correction processing for correcting a defect in the image data caused by characteristics of the image reading unit;
a first output control unit that selectively outputs the first-processed image data to any of the input control unit and the storage unit;
a control unit that decides whether the first output control unit is to output the first-processed image data to the input control unit or the storage unit;
a second image-processing unit that receives the first-processed image data from the input control unit and performs second image processing on the first-processed image data thereby obtaining second-processed image data, the second image processing including a color space conversion; and
a second output control unit that outputs the second-processed image data.

12. The image forming apparatus according to claim 11, wherein the second output control unit outputs the second-processed image data to the storage unit.

13. The image forming apparatus according to claim 12, wherein the input control unit receives an input of the first-processed image data from any of the first output control unit and the storage unit.

14. The image forming apparatus according to claim 11, further comprising a compressing/elongating/contracting unit that compresses or elongates/contracts the first-processed image data stored in the storage unit.

15. An image processing method comprising:
performing first image processing on image data received from an image reading unit thereby obtaining first-processed image data, the first image processing including correction processing for correcting a defect in the image data caused by characteristics of the image reading unit;
selectively performing an output processing or a second image processing,
the output processing including outputting the first-processed image data to an external storage unit, and
the second image processing including processing the first-processed image data thereby obtaining second-processed image data, the second image processing including a color space conversion.

16. The image processing method according to claim 15, wherein
the second image processing further includes a reducing/enlarging process,
the selectively performing includes performing the second image processing when a processing speed of the reducing/enlarging process is higher than an input speed of the image reading unit, and includes performing the output processing when the processing speed of the reducing/enlarging process is lower than the input speed of the image reading unit, and
the second image processing includes performing a first color space conversion for converting the first-processed image data into print image data and the reducing/enlarging process on the print image data thereby obtaining the second-processed image data.

17. The image processing method according to claim 15, wherein the second image processing including outputting the second-processed image data to the external storage unit.

18. The image processing method according to claim 16, wherein
the first-processed image data is red-green-blue image data,
the second-processed image data is cyan-magenta-yellow-black image data, and
the first color space conversion includes converting the red-green-blue image data into the cyan-magenta-yellow-black image data.

19. The image processing method according to claim 15, wherein the selectively performing includes deciding whether to perform the output processing or the second image processing based on an instruction from outside.

* * * * *